United States Patent [19]

Caravello et al.

[11] 3,875,352

[45] Apr. 1, 1975

[54] CABLE PAIR TEST APPARATUS

[75] Inventors: Ronald G. Caravello, Massapequa, N.Y.; John Mickowski, Maplewood, N.J.

[73] Assignee: Porta Systems Corp., Syosset, N.Y.

[22] Filed: Aug. 31, 1973

[21] Appl. No.: 393,408

[52] U.S. Cl. .......................................... 179/175.2 R
[51] Int. Cl. .......................................... H04m 3/22
[58] Field of Search... 179/175.25, 175.2 R, 175.2 C, 179/175.3, 175.1 R; 178/69 G; 340/251

[56] References Cited

UNITED STATES PATENTS

| | | | |
|---|---|---|---|
| 1,716,471 | 6/1929 | Tharp | 179/175.25 |
| 2,680,161 | 6/1954 | Clement | 179/175.2 R |
| 3,040,243 | 6/1962 | Weiss | 340/251 |
| 3,755,632 | 8/1973 | Johnson | 179/175.3 |

*Primary Examiner*—Thomas A. Robinson
*Attorney, Agent, or Firm*—Philip D. Amins

[57] ABSTRACT

Test equipment connectable via a multi-pair cable to a central office, branch exchange or key system distributing frame for performing operational checks on selected line pairs as well as for detecting idle-busy status is disclosed. The equipment is manually manipulated by a frame test man to make tests and may be used also to verify cable pair assignment to particular telephone numbers. The status of lines as well as test results are visually indicated.

15 Claims, 2 Drawing Figures

CABLE PAIR TEST APPARATUS

BACKGROUND OF THE INVENTION

This invention concerns communication systems and in particular relates to improved apparatus for testing, verifying and interrogating cable pairs (lines, trunks) as well as associated switching equipment to ascertain assignment of pairs and trouble conditions thereon.

Cables comprising a plurality of twisted pairs, each including a tip and ring conductor, enclosed in a lead sheath are well-known in telephony communication. These cables may constitute individual links between a telephone central office and a plurality of telephone subscribers positioned remotely therefrom in the same geographical area. Also, the cables may be spliced in tandem to constitute a continuous long cable in which the twisted pairs of one cable are joined to the twisted pairs of each succeeding cable section. In either event, it is imperative that the discrete tip and ring conductor pairs at the opposite terminals, e.g., distributing frame, be connected to previously assigned equipment located thereat. To achieve this, it is necessary to employ suitable testing apparatus to ensure that the tip and ring conductors of each twisted pair are properly identified and correspond at the opposite cable terminals.

The prior art shows complex, automatically and synchronously rotating office units and follower stepping indicators in the field which rotate together until a discontinuity of a wire is detected and that discontinuity signaled, stopping both units simultaneously. Also known in the prior art are complex coded signals impressed at the office and detected on the distributing frame or other field positions. Such elaborate units require high levels of skill to maintain them in good working order and even then are not altogether reliable because of the adverse effects of propagation and occasional equipment faults.

At the other end of the spectrum of apparatus available, the prior art shows simple systems in which a helper in the office imposes a tone onto a given wire and a repairman at the frame or in the field searches through the wires until he finally detects the tone on the given wire. This system is as dependable as the repairman detecting the tone, as distinguished from capacitance coupled tones on adjacent wires, but is expensive and time consuming since it requires two workers, both of which must have unique skills, thorough understanding of cabling layouts and equipment functioning, and reliable in their work.

The prior art also discloses systems in which a given numbered wire can be dialed from the remote position. This system is useful for identifying a single wire pair but, becomes time consuming when multiple wire pairs are to be identified and operated upon; such as, when a group of wire pairs is to be changed from one cable to another cable.

Accordingly, it can be seen that the prior art has not provided a simple, economical method and system; employing reliable, long tested equipment; that would identify with certainty and speed, conductors in a multi-conductor means without a time consuming operation requiring a high level of skill in the operating personnel, or a plurality of personnel.

It is yet another object of this invention to provide a device whereby conductor status and identification can be performed by one man, and at much higher speeds.

Another object of this invention is to provide the method of and the apparatus for locating, at the remote extremity of a cable, individual pairs of conductors in the cable composed of a plurality of such conductors and their numerical relation with each other at the other extremity of the cable in which the condition or status of the pairs is ascertained before the identifying operation is carried out.

A further object involves the provision of a testing device for use with automatic number identifying systems to identify multidigit subscriber identification designation associated with tested cable pairs.

SUMMARY OF THE INVENTION

These and other objects of this invention are obtained by providing a portable testing and cable pair verifier which is connectable directly to a distributing frame and controlled by a single repairman to ascertain initially the idle-busy status of each tested line and thereafter, if idle, the selected line is tested for line faults. The test apparatus is equipped to automatically perform tests for opens, shorts, false connections to ground or to battery (FEMF), and capacitive coupling problems. A display comprising LED's provide trouble indications.

The test apparatus may be directly connected to the distributing frame and coupled to a plurality of cable pairs which are selectable for test at the portable unit. Upwards of 50 pairs can be accommodated in this fashion. Alternatively, the individual pair test cords may be used to couple to the test apparatus.

In those circumstances where the office is equipped with so-called ANI-automatic number identification systems the portable test unit can be used to test and verify assigned directory numbers associated with a working subscriber cable pair.

The test apparatus is also equipped to automatically dial any number of digits up to a maximum of ten digits. The digit address is manually set up on thumbwheel switches. The digit registered on the thumbwheels is automatically dialed each time a manual switch is operated by the repairman.

The portable test equipment is outfitted with an internal power supply comprising batteries and a recharging circuit. Also the equipment may be operated on 115 volt line current while charging the internal batteries. Importantly, the test equipment can be operated on the conventional 48V d.c. supply found in most switching plants.

BRIEF DESCRIPTION OF THE DRAWINGS

The foregoing objects as well as other advantages of this invention are realized in accordance with an illustrative embodiment thereof described in detail in the attached drawing in which:

FIG. 1B, show the organization of the portable test set 10 as well as the wire interconnections between the various parts thereof.

Figure 1A:
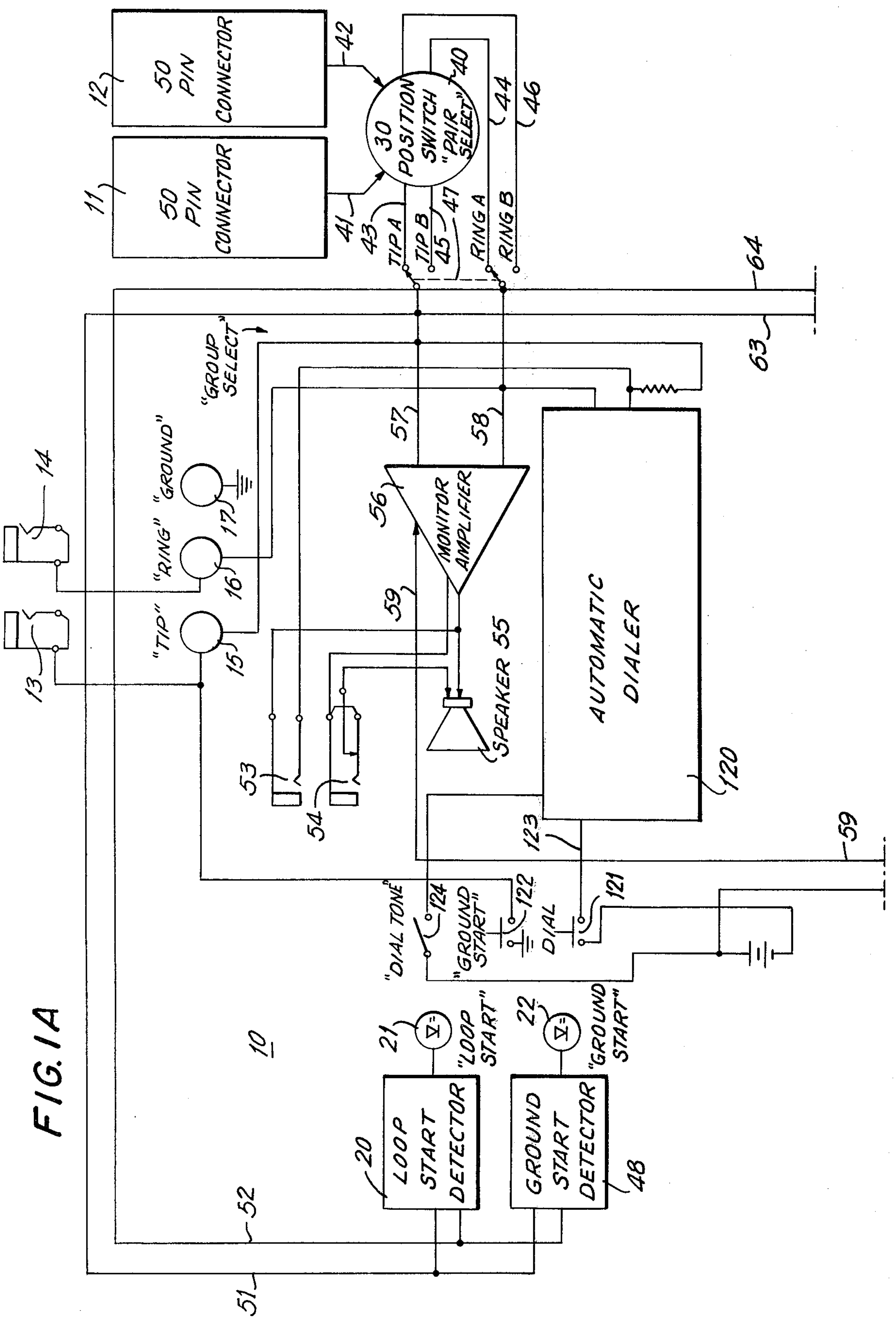
FIGS. 1A and 1B, with FIG. 1A situated above

It is to be noted that details of the automatic dialer shown in block diagram form in FIG. 1A are given in our co-pending application, Ser. No. 350,903, filed on Apr. 13, 1973, entitled ELECTRONIC AUTOMATIC DIALING APPARATUS, and assigned to the assignee hereof. In addition, various other functional circuits are shown in block diagram form to simplify this disclosure and thereby the system organization of this test unit may be advantageously appreciated.

Operating Procedure

It is considered that the best approach to describing this invention is to initially examine the various operational tests which can be carried out by the portable unit. Following this will be a discussion of the circuitry and system organization.

Hook-Up

A special double connector ended cable is furnished for connecting portable test unit 10 into a distributing frame terminal strip. This cable (not shown) is equipped at its opposite end with a standard frame test connector, e.g., MDF 300, 444 or C–50 test connector. The mating connectors 11 and 12 of unit 10 are shown in FIG. 1A at the upper right hand corner.

Alternative provisions for plugended communication pairs are provided at jacks 13 and 14, and direct wire connections at terminals 15 and 16, all shown in FIG. 1A.

Test Set Indicators

The unit 10 is equipped to indicate a variety of conditions on any tested line, as well as the status of unit 10 itself. For this purpose light emitting diodes are connected to a particular function test circuit, e.g., loop start detector 20, shown to the left side of FIG. 1A. For convenience, the test unit indications are tabulated below.

Figure 1B:
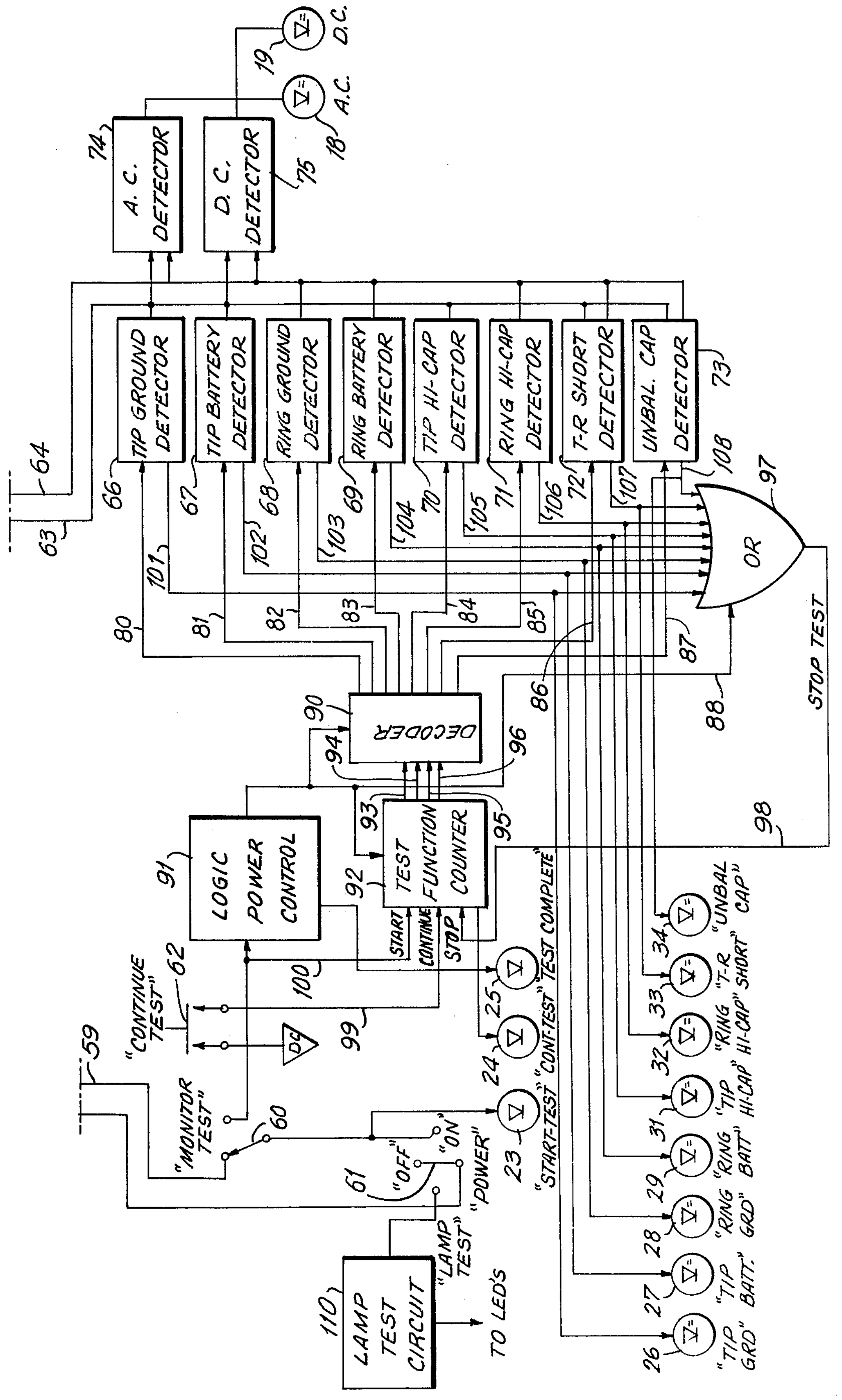

A. Idle status of loop start lines
B. Idle status of ground start lines
C. Idle Monitoring
D. Start Test
E. Continue Test
F. Test Completed
G. Battery under charge In addition, eight different trouble line fault conditions are indicated by the LED indicators depicted at the lower left of FIG. 1B. These are:

A. false tip lead ground
B. false tip lead battery
C. false ring lead ground
D. false ring lead battery
E. tip lead high capacity value to ground
F. ring lead high capacity value to ground
G. short between tip and ring leads (less than 50,000 ohms)
H. unbalance-capacitive value of tip lead and ring lead to ground differ by greater than 5 percent

Cable Pair Selector

Before initiating an automatic test sequence, the craftsman selects a particular line using pair select switch 40. This action connects two pair of leads from cables 41 and 42 (tip and ring conductor) to conductors 43 and 44 and to conductors 45 and 46. One of these switched pairs are selected for the test by A and B pair switch 47.

Immediately, the type of line selected is identified as a "Loop Start" or as a "Ground Start" line. The former is the conventional line used with residential phone or key telephone systems. Ground Start lines are used with coin station equipment or Private Branch Exchanges. The "loop start" indicator 21 or "ground start" indicator 22 provides the indications for the circuitry respectively of detectors 20 and 48 which energize the appropriate indicators. Both detectors connect via conductors 51 and 52 to the tip and ring conductors of the line under test to ascertain the line type.

Line Monitoring

The craftsman can listen to the particular line under test by plugging a headset into jacks 53 and 54 or can monitor via loudspeaker 55. Jack 54 is equipped with cut-off contacts to prevent both speaker 55 and headsets from being concurrently connected to the output of monitoring amplifier 56. The obvious path for coupling the input of amplifier 56 to the line under test may be traced over conductors 57 and 58.

Amplifier 56 is energized by operating the monitor-test switch 60 (shown in FIG. 1B) to apply battery to conductor 59.

Automatic Testing

A plurality of tests are performed on each selected line automatically operating Monitor-Test switch 60 to the test position after the power switch 61 is switched "on." When the test is complete, indicator "Test Complete" 25 is energized and the craftsman advances selector switch 40 to the next position and reoperates switch 60 to start a new test cycle.

If a trouble occurs during the test, the testing cycle is stopped and an indicator (one of eight) is energized to depict the trouble. After the craftsman notes the trouble condition, the test cycle is resumed by operating the "continue test" switch 62. If an additional trouble is detected, the switch 62 can be re-operated to begin the test cycle again. Each time the test is continued after a trouble indication, "cont. test" indicator 24 is energized. Of course, at the end of the cycle, indicator 25 operates.

The particular conductor pair which is to be subjected to the automatic test sequence is connected via conductors 63 and 64 to separate detectors 66-73. In addition, detectors 74 and 75 are connected to the tested conductor pair to determine and to indicate an unusual a.c. or d.c. voltage situation. If such condition exists indicators 18 or 19 are energized.

The detectors 66-73 are energized in sequence under control of signals over leads 80 to 88 as directed by decoder 90, logic power control 91, and test function counter 92. The initial "start" signal is sent jointly to control 91 and to counter 92. The latter provides a sequence of unique signals over leads 93 to 96 to direct decoder 90 in sequentially energizing leads 80 to 88 emanating from decoder 90.

Each detector 66-73 has separate output leads 101-108 which control separate indicators 26 to 34 as well as connect to "OR" gate 97. If any indicator is energized during a test cycle, a signal is sent over lead 98 which connects to the output gate 97 to stop counter 92.

Of course, it is to be recognized that certain detectors (66–73) do not have to be utilized on particular types of lines. For example, on an idle "loop start" line, activation of tip ground detector 66 is normal because a ground is normally present on the tip conductor of these lines. Also, on "ground start" lines battery is normally present on the "ring" side and therefore an indication by detector 69 is not a trouble. Logic Power Control 91 is capable of modifying decoder 90 to skip such test where appropriate but in our present embodiment, we have chosen to run all tests on all lines so that the craftsman can check for missing grounds or batteries.

Detecting Spare Lines

A spare cable pair (not an assigned working pair) is detected if indicators 21 and 22 are not energized on a particular line. On such lines all outputs from detectors 66-73 should be negative.

Lamp Test

An open LED indicator can be easily checked, and should be in fact checked before a test cycle on a group of lines, by operating power switch 61 to the "Lamp Test" position. This action activates Lamp Test Circuit 110 which concurrently applies energizing current to all LED's. Thus, a bad LED can be easily determined.

Outgoing Calls

Automatic Dialer 120 is connected to any line under test and it is energized to forward a preset digital address by operation of switch "DIAL" 121. The latter couples battery to conductor 123 over an obvious path. Preliminary operation steps are required on "loop start" and on "ground start" lines. On all types of lines, switch 124 must operate to furnish a holding loop.

Further details are given in the aforementioned copending application.

Circuit Details

Detectors 66-73

The following Test Parameter Table will provide test circuit details.

TEST PARAMETER TABLE

| Detectors | Condition | Tip or Ring | | Tip & Ring | Parameters For Detector Activation |
|---|---|---|---|---|---|
| 67, 69 | Battery | X | X | | −10V DC to −130 VDC 10V DC to 130 VDC |
| 66, 68 | Ground | X | X | | Any ground Condition |
| 70, 71 | Hi Capacitance | X | X | | Capacity to ground is greater than .4 Micro Farad |
| 75 | Hi DC Voltage | X | X | | −20V DC to −130 VDC 52 DC to 130 VDC |
| 72 | Short Circuit | | | X | Less than 50,000 Ohms |
| 73 | Unbalanced | | | X | Tip to Ground Capacity exceeds Ring to Ground Capacity by more than 5% |
| 74 | AC Volt | X | X | X | Any AC Voltage from 10V AC to 240 V AC |

What is claimed is:

1. A cable fault detector with integrated means for verifying the status of lines as well as determining the type of line being selected for test comprising means for associating a plurality of communication pairs with said detector including means for selecting individual ones of said pairs for test; means under control of said selecting means for testing the individual pairs to determine the type of line under test; indicators energized by said testing means to indicate a ground start line, spare line, and a loop start line; and means under control of said selecting means in cooperation with a manual start signal to run a sequence of line fault checks which establish the working status of said individual line.

2. The detector of claim 1, further including a decoder and logic control means for directing the line fault check sequence so that, upon determining the line fault, the sequence is halted until restarted by another manual start signal.

3. The detector of claim 2, further including indicator means operative to depict the period that the line fault sequence is running, determination of a fault which stops the sequence, and identity of each line fault separately.

4. The detector of claim 1, further including a line monitoring circuit including amplifier means under control of said selecting means to provide a local transmission path to monitor signals on said individual line.

5. The detector of claim 4, further including an automatic dialer which is capable of being manually set to forward a prescribed group of digits over said individual line.

6. The detector of claim 1, further including a pair of voltage detectors to indicate the presence of abnormal voltages on the individual line together with visual indicators for warning of the abnormality.

7. A portable line fault and verifier unit for connection to a plurality of line terminations of a distributing frame comprising means for selecting a particular one of said terminations to perform a test on the line associated therewith, means connected to said particular line for identifying the type of line under test by detecting the presence of predetermined voltage on the conductors of said line, and automatic test apparatus for running a plurality of line fault checks on the selected line including a check for abnormal voltage potentials.

8. The verifier unit of claim 7, wherein said automatic test apparatus includes ten separate fault detectors under control of a decoder which consecutively connects each detector to the particular line under test, and separate visual indicators connected to each detector to furnish an indication.

9. The verifier unit of claim 8, wherein said detectors are capable of finding false grounds and batteries on said conductors as well as capacity values below or above a prescribed value.

10. The verifier unit of claim 7, further including a line monitoring circuit which connects to the line under test under control of said selecting means, and said circuit including an amplifier coupling to a speaker as well as to headset jacks for monitoring signals on the tested line.

11. The verifier unit of claim 7, further including an automatic dialer wherein a coded address can be preset, and said dialer is connected under control of said selecting means to the line under test for forwarding thereover said preset address to verify the assignment of said tested line to a particular subscriber.

12. The verifier unit of claim 7, further including means cooperating with said automatic test apparatus for halting the tests upon detection of the first line fault, means for resuming the line fault tests under manual control, and means for indicating the end of the series of checks so that the selecting means can be advanced to another one of said terminations.

13. The verifier unit of claim 12, further including a line fault detector which determines a variation in capacitance to-ground values from each line conductor in excess of a predetermined tolerance value.

14. The verifier unit of claim 8, further including means under manual control for applying simultaneously energizing potentials to all of said indicators to verify proper operation, and wherein said indicators are light-emitting diodes.

15. A portable test unit for monitoring, testing, determining line type and status of a plurality of lines comprising a frame connector extending from a cable for coupling to a plurality of line terminations on a distributing frame simultaneously; said cable being equipped with a pair of connectors at the opposite end thereof for connecting to said unit; a line pair selector wired internally to said unit connected to said cable and adapted to select a particular line for test; the output wiring of said selector being connected directly to a monitoring circuit, circuit type detectors and abnormal voltage detectors, and indirectly to eight separate line fault detectors; said line fault detectors being under control of an automatic test circuit which directs an orderly consecutive test of the line under test with said line fault detectors; and a plurality of light-emitting diodes used as visual indicators connected to all of said detectors to furnish trouble and circuit condition indications.

* * * * *